(No Model.)
F. M. WATERS.
MECHANICAL MOVEMENT.
No. 271,556. Patented Jan. 30, 1883.
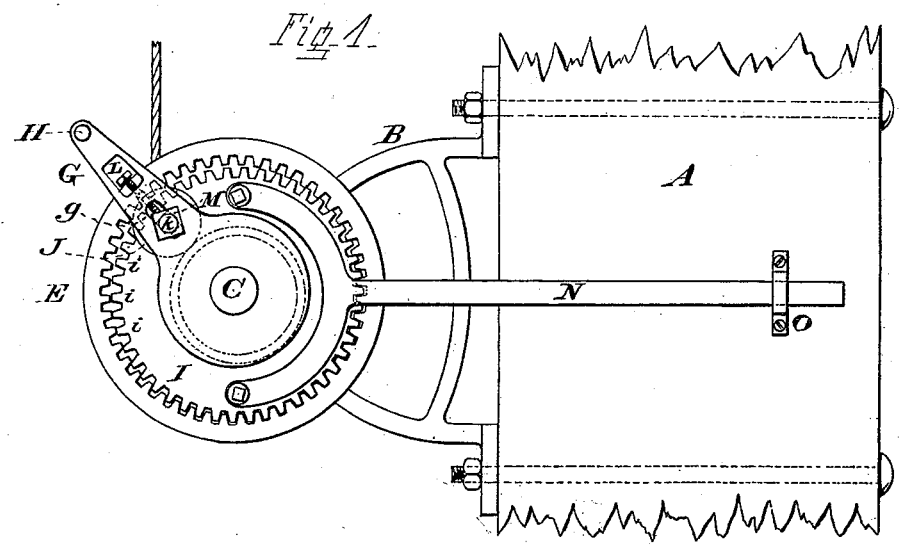
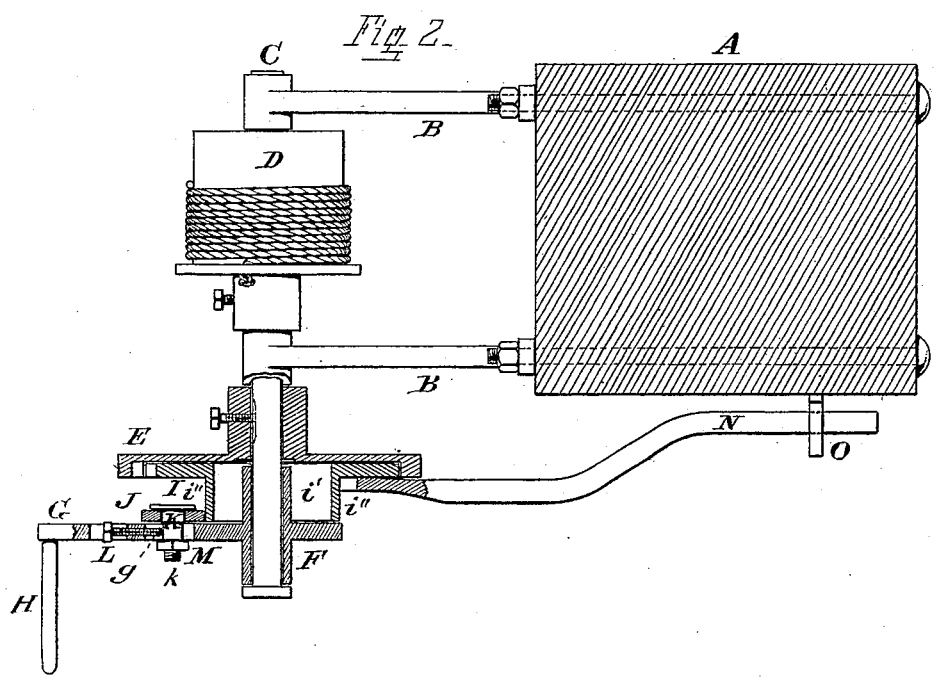
Attest
Carl Spengel
Wm J Jayers
Inventor
Frank M Waters
by Knight Bros.
Atty's

UNITED STATES PATENT OFFICE.

FRANK M. WATERS, OF SPRINGFIELD, OHIO.

MECHANICAL MOVEMENT.

SPECIFICATION forming part of Letters Patent No. 271,556, dated January 30, 1883.

Application filed November 20, 1882. (No model.)

*To all whom it may concern:*

Be it known that I, FRANK M. WATERS, of Springfield, Clarke county, Ohio, have invented a new and useful Mechanical Movement, of which the following is a specification.

My invention relates to an improvement in those devices for converting a fast rotary motion into a much slower one, in which a drive-wheel, which is caused to gyrate without rotation in a small circular path in its own plane, operates to slowly rotate a slightly-larger internal-gear cog-wheel of corresponding pitch, but greater number of teeth. This has usually been accomplished by the rotation of a circular cam or eccentric within said drive-wheel, just sufficiently out of center with the driven wheel to bring the cogs of said driver in successive mesh with the consecutive cogs of said driven wheel around its circuit, and in so doing to rotate the said driven wheel slowly in the opposite direction of the eccentric's rotation. A defect of this arrangement has been in its liability to wear loose and to possess too much slack motion, and finally to become inoperative. To overcome this difficulty I form the driver with a boss concentric with its periphery, and arrange upon the arm of the operating crank a roller, whose radial distance from the axis of the driven wheel is such as to constantly bring the opposing gears of the driving and driven wheels in mesh on the (for time being) diametrically-remote side to said roller. This roller, being adjustable, can be set up at any moment to take up any slack motion, and by this means the apparatus may be kept in perfect working order for an indefinite period.

In the accompanying drawings, Figure 1 is a side elevation, and Fig. 2 a horizontal section, of a machine embodying my invention.

A may represent a post or other fixture; B, bearings for shaft C, to which is keyed an internal-gear cog-wheel, E.

Revolving upon shaft C is a sleeve, F, having an arm, G, from which projects a handle, H. The member F G H is known in this specification as the "crank." The space between the wheel E and the arm G is occupied by an annulus, I, called the "driver," having cogs $i$ around its periphery, of same pitch as those $e$ of wheel E, but of less number.

The central opening, $i$, of annulus I permits the cogs $i$ of said annulus to be forced into mesh with those of the wheel E by the pressure of a roller, J, against boss $i''$ on said annulus, which rotates about a stud, K, adjustable in a slot, $g$, in arm G by means of set-screw L, and capable of being held to any adjustment toward or from the center of motion by nut M on the shank $k$ of stud K.

Rotation of the driver is prevented by a rod, N, which extends rigidly from it through a staple, O.

The mechanism may be employed to produce any slow and powerful rotation, and may be either a manual machine, as shown, or be operated by power.

Among numerous obvious applications of the device is that of a capstan or hoist. For this purpose a drum, D, for a hoisting-rope may be secured to the shaft C.

I claim as new and of my invention—

In combination with internal gear-wheel, E, upon shaft C, the externally-intermeshing annulus I, having the boss $i''$, rod N, and staple O, and the crank F G H, having the adjustable roller J.

In testimony of which invention I hereunto set my hand.

FRANK M. WATERS.

Attest:
E. O. HAGAN,
M. E. DAVIS.